(12) United States Patent
Van Druff et al.

(10) Patent No.: US 7,418,879 B2
(45) Date of Patent: Sep. 2, 2008

(54) LATCHING INERTIAL REEL

(76) Inventors: Charles E. Van Druff, 24882 Buckboard La., Laguna Hills, CA (US) 92653; James Warrick, 1899 Meadow Ridge, Prescott, AZ (US) 86305; Alex Devonport, 4944 W. Joyce Cir., Glendale, AZ (US) 85305; John Churilla, 6450 Grand View Trail, Riverside, CA (US) 92509

( * ) Notice: Subject to any disclaimer, the term of this patent is extended or adjusted under 35 U.S.C. 154(b) by 0 days.

(21) Appl. No.: 11/378,578

(22) Filed: Mar. 17, 2006

(65) Prior Publication Data
US 2006/0243070 A1 Nov. 2, 2006

Related U.S. Application Data

(60) Provisional application No. 60/675,794, filed on Apr. 27, 2005.

(51) Int. Cl.
*G01L 1/26* (2006.01)
*G01L 5/04* (2006.01)

(52) U.S. Cl. .................................. 73/862.391

(58) Field of Classification Search ............ 73/862.391; 242/383.4
See application file for complete search history.

(56) References Cited

U.S. PATENT DOCUMENTS

| | | | | |
|---|---|---|---|---|
| 3,189,296 | A * | 6/1965 | Wrighton et al. ............ | 242/374 |
| 3,365,231 | A | 1/1968 | Burtt | |
| 3,430,891 | A * | 3/1969 | Burleigh .................. | 242/383.4 |
| 3,831,878 | A * | 8/1974 | Griffin ..................... | 242/384.5 |
| 3,897,913 | A * | 8/1975 | Hall ........................ | 242/384.1 |
| 3,957,304 | A | 5/1976 | Koutsky et al. | |
| 3,988,028 | A | 10/1976 | Satzinger | |
| 4,057,200 | A * | 11/1977 | Ubukata et al. .......... | 242/384.6 |
| 4,220,294 | A * | 9/1980 | DiPaola ................... | 242/384.1 |
| 4,262,858 | A * | 4/1981 | Takada .................... | 242/384.6 |
| 4,534,521 | A * | 8/1985 | Sylven .................... | 242/384.6 |
| 4,925,124 | A * | 5/1990 | Hoyt et al. ............... | 242/383.4 |
| 4,934,626 | A * | 6/1990 | Kimura ................... | 242/384.6 |
| 5,401,072 | A | 3/1995 | Farrand | |
| 5,533,775 | A | 7/1996 | Cyliax | |
| 5,642,916 | A | 7/1997 | Dybro et al. | |
| 6,152,526 | A | 11/2000 | Persson et al. | |
| 6,257,663 | B1 | 7/2001 | Swierczewski | |
| 6,322,140 | B1 | 11/2001 | Jessup et al. | |
| 6,412,863 | B1 | 7/2002 | Merrick et al. | |
| 6,572,147 | B2 | 6/2003 | Webber et al. | |

* cited by examiner

*Primary Examiner*—Edward Lefkowitz
*Assistant Examiner*—Octavia Davis
(74) *Attorney, Agent, or Firm*—Kenneth L. Green; Edgar W. Averill, Jr.

(57) ABSTRACT

A latching inertial reel temporarily holds an inertial reel in a locked position during a lateral acceleration and resetably holds the reel in a latched position as a result of a vertical acceleration. The reel is latched when a latching sensor experiences a vertical acceleration above a threshold. A latch holds the reel in the latched position after the acceleration reduces to prevent subsequent injury from secondary impacts of a vehicle occupant with objects or surfaces in the vehicle. The latch may later be reset to release the reel. A vehicle seat may further include a seat inertial reel to provide support to the seat during a crash. The seat inertial reel may be attached to a floor mounting point, or to an elevated mounting point.

8 Claims, 3 Drawing Sheets

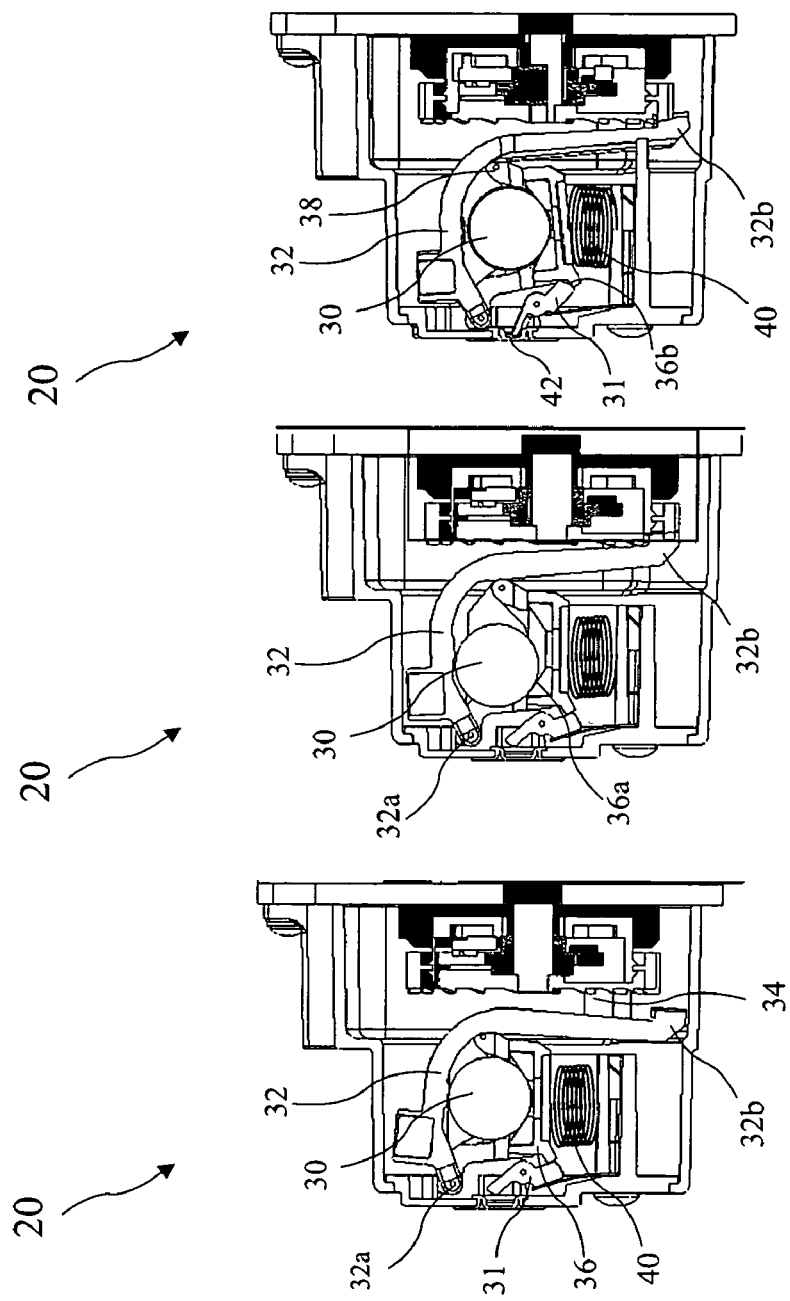

LATCHING INERTIAL REEL

The present application claims the benefit of U.S. Provisional Application Ser. No. 60/675,794, filed Apr. 27, 2005, which application is incorporated herein by reference.

BACKGROUND OF THE INVENTION

The present invention relates to restraint systems and in particular to a latching restraint system which latches during a crash, and remains latched until a release is actuated.

Generally, automotive and FM shoulder strap type Inertial Reels (IRs) are of the lock/unlock type. That is, the IR will lock to protect the occupant at the onset of either vehicle motion or shoulder strap acceleration above a first higher preset acceleration level, and automatically unlock when the acceleration level drops below a second lower preset acceleration level. The acceleration levels are usually set at very low thresholds. The low thresholds insure consistent IR locking in crash situations. After the acceleration level event passes, the IR automatically unlocks to allow normal operation of the restraint system with flexibility for the occupant to move within the constraints of the maximum extension bounds of the restraint system.

Unfortunately, a problem may occur with lock/unlock type restraint systems in certain crash or other scenarios. The onset of multiple discreet lock (or crash) events and the ability to unlock between events could allow the occupant to move away from a protected position where his shoulders are held tightly to the seat back. A typical event is an extended crash scenario where second and third impacts occur following the initial impact, for example, a military vehicle involved in a bomb blast from underneath. The initial concussion causes the restraint to lock. The trajectory of the vehicle will allow the restraint system to unlock as the vehicle ascends and then returns to earth. While the restraint system is unlocked, the occupant may become displaced from the protected position. When the vehicle impacts the ground, the occupant is free to impact the vehicle interior. The risk of injury is significantly higher in such situations. Similar scenarios may be predicted for multiple independent crash events with civilian vehicles, particularly after an airbag deflates.

Additionally, vehicle seats often have occupant restraint systems mounted to the seat. As a result, the seats must bear crash loads through the structure of the seat. The resulting forces on the seat structures, and the forces at the seat to vehicle mounting points, are often significant, and substantial displacement of the vehicle occupants may result.

BRIEF SUMMARY OF THE INVENTION

The present invention addresses the above and other needs by providing a latching inertial reel which holds a belt reel in a locked position until a release is actuated. The belt reel is locked when a crash sensor experiences an acceleration over a threshold. A latch holds the belt reel in the locked position after the acceleration reduces to prevent subsequent injury from secondary impacts of a vehicle occupant with objects or surfaces in the vehicle. The latch may later be released to free the occupant. A vehicle seat may further include a seat inertial reel to provide support to the seat during a crash. The seat inertial reel may be attached to a floor mounting point, or to an elevated mounting point.

In accordance with one aspect of the invention, there is provided a locking inertial reel having a reel portion, a locking tooth mechanism connected to the reel portion, a locking portion, and a latching portion. The locking portion comprises a horizontally sensing crash sensor and a locking mechanism for locking the reel portion. The locking mechanism includes a locking lever having a pivot end and an engaging end for engaging the locking tooth mechanism to lock the reel portion. The locking lever is moveable to engage the locking tooth mechanism in response to the crash sensor. The latching portion includes a vertically sensing latching sensor and a latching mechanism. The latching mechanism is responsive to the latching sensor and cooperates with the locking lever to engage the locking tooth mechanism.

In accordance with another aspect of the invention, there is provided a latching inertial reel. The latching inertial reel includes a reel portion and a locking portion. A locking tooth mechanism is connected to the reel portion and cooperates with a locking lever. The locking lever has a pivot end, and an engaging end which engages the locking tooth mechanism to lock the reel portion. The locking portion includes a locking mechanism including a ball residing in a ball seat having a sloped wall. The ball is displacable up the sloped wall by a horizontal acceleration, and the displacement of the ball up the sloped wall urges the locking lever to rotate about the pivot end to engage the engaging end with the locking tooth mechanism. The locking portion further includes a latching mechanism including the ball, the ball seat, a ball seat pivot, and a spring vertically supporting the ball seat. The locking lever pivot end is connected to the ball seat. Compressing the spring causes the ball seat to pivot about the ball seat pivot, the locking lever to pivot with the ball seat, and the locking lever to engage the locking tooth mechanism.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A is a latching inertial reel according to the present invention in an unlocked position.

FIG. 3B is a latching inertial reel according to the present invention in a locked position.

FIG. 3C is a latching inertial reel according to the present invention in a latched position.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
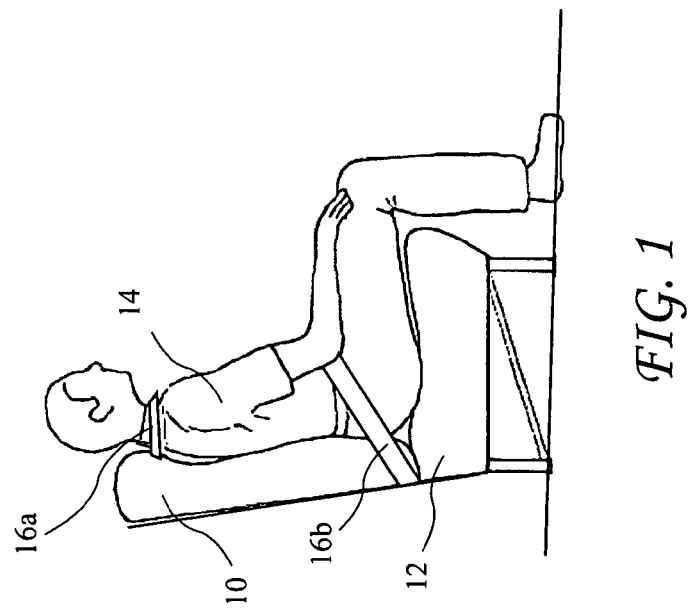
FIG. 1 is a side view of a seat and occupant.

A side view of a seat comprising a seat back 10 and a seat bottom 12, and an occupant 14, is shown in FIG. 1. The occupant 14 is held in the seat by a lap belt 16b, and a shoulder belt 16a (which may be one of two shoulder belts). The belts 16a and 16b are often connected to the seat, or other structure, using inertial reels. The inertial reels allow the belts 16a and 16b to be extended from or retracted into the inertial reel in the absence of accelerations, and prevent the extending of the belt 16a or 16b during accelerations, for example, during a crash. The inertial reel thus provides convenience and safety for the occupant. Unfortunately, known inertial reels unlock when accelerations subside, and may allow the occupant to be injured in the event of a second impact shortly following a first impact.

Figure 2A:
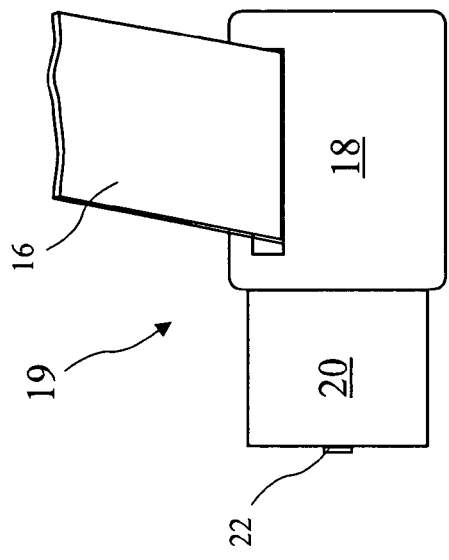
FIG. 2A is a side view of a latching inertial reel according to the present invention.
Figure 2B:
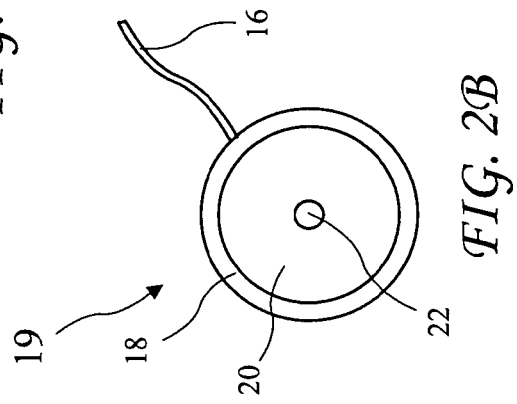
FIG. 2B is an end view of the latching inertial reel according to the present invention.

A front view of a latching inertial reel 19 according to the present invention in shown in FIG. 2A, and an end (or side) view of the latching inertial reel 19 is shown in FIG. 2B. The latching inertial reel 19 comprises a reel portion 18, a locking portion 20, and a release button 22. A belt 16 (which may be the lap belt 16b or the shoulder belt 16a) is wound inside the reel portion 18, and in an unlocked position, the belt 16 freely extends from the reel portion 18 and retracts into the reel portion 18. The locking portion 20 includes at least one inertial senor. When the inertial sensor experiences certain accelerations, the locking portion 20 locks the reel portion 18 preventing the extending and retracting of the belt 16a or 16b.

A detailed view of the locking portion 20 according to the present invention is shown in FIG. 3A in an unlocked and unlatched (or ready) position. A locking tooth mechanism 34 is attached to a reel in the reel portion 18 to control the extending and retracting of the belts 16a or 16b. A locking lever 32 is disengaged from the locking tooth mechanism 34, and the locking tooth mechanism 34 is free to rotate in the unlocked position, and as a result, the reel portion 18 is free to release or take-up the belt 16a or 16b.

A detailed view of the locking portion 20 according to the present invention is shown in FIG. 3B in a locked and unlatched position. The locking portion 20 includes a locking mechanism comprising a crash sensor and the locking lever 32. The crash sensor (or sensing circuit) comprises a sensor ball 30 residing on a horizontally residing annular ball (or sensor) seat 36 for sensing a normal onset event (i.e., a vehicle crash). The seat 36 includes a sloped wall 36a sloping upward away from a ball resting point. The locking lever 32 has a lever pivot end 32a and a lever engaging end 32b. The lever engaging end 32b is configured to engage the locking tooth mechanism 34 in a crash event to lock the reel portion 18.

Comparing FIG. 3B to FIG. 3A, the sensor ball 30 reacts to an acceleration (e.g., a vehicle movement or crash event) by climbing the sloped wall 36a and urging the locking lever 32 to pivot about the lever pivot end 32a from the unlocked position (in FIG. 3A) into the locked position in contact with the locking tooth mechanism 34 (in FIG. 3B.) The sensor ball 30, sloped wall 36a, locking lever 32 and locking tooth mechanism 34 thus provide the locking mechanism. Specifically, the sloped wall 36a of the ball seat 36 resides 360 degrees around the ball 30. The slope of the sloped wall 36a is designed to couple a horizontal acceleration of a vehicle into a diagonal (both horizontal and vertical) motion of the ball 30 up the sloped wall 36a, which motion of the ball 30 causes the locking lever 32 to pivot about lever pivot end 32a and to engage the toothed mechanism 34 and thereby lock the reel portion 18. More specifically, the cooperation of the locking lever 32 with the locking tooth mechanism 34 acts to lock the reel portion 18 from further payout. Such known operation concept is embodied in, for example, Modular M-2K Belt Retractor Assembly ball and lever arm system for locking seat belt reels made by Key Safety Systems, Inc. in Detroit, Mich., and others. The sensing circuits are typically set at a very low acceleration level to keep the occupant 14 close to a seat (see FIG. 1) during the onset of a potential crash, and to help the occupant 14 remain in position to keep control of a vehicle during bumps or maneuvers.

The locking mechanism of the locking portion 20 may include elements based on known operational concepts for locking an inertial reel 18 during an onset event, and the locking mechanism described in FIG. 3B is an example of a preferred locking mechanism. However, a locking portion 20 including any locking mechanism is intended to come within the scope of the present invention.

In the case of known restraint systems, the occupant 14 is held from further movement during the onset event (i.e., while the crash sensor senses a horizontal acceleration). As soon as the acceleration subsides to a level less than a pre-calibrated acceleration level, a known inertial reel unlocks, and allows free movement of the occupant 14. The acceleration level for an onset event is preferably set to between approximately 0.3 Gs to approximately 6 Gs, and more preferably set between approximately 0.4 Gs to approximately 0.7 Gs, and most preferably set to approximately 0.7 Gs for an on the road vehicle and most preferably set to approximately 5.5 Gs for aircraft.

In addition to providing locking during an onset event, the locking portion 20 of the present invention further includes a latching mechanism providing a capability to latch the inertial reel 19 as shown in FIG. 3C. The latching mechanism includes the locking lever 32 and a latching sensor comprising the ball 30, the ball seat 36, and a calibration spring 40. The latching sensor responds to an acceleration level established by the spring 40 residing under the ball 30 and the ball seat 36. The latching sensor (and thus the latching mechanism) preferably responds to a positive (or upward) vertical acceleration between approximately 1 G and approximately 15Gs. In this instance, the acceleration sensed is primarily a vertical acceleration, not a lateral (or horizontal) acceleration, although there may be some mechanical coupling between elements resulting in a lateral acceleration affecting the latching sensor. When a high vertical acceleration is experienced, the ball 30 and ball seat 36 are forced downward compressing the spring 40. If the vertical acceleration (or the vertical component of any acceleration) sufficiently compresses the spring 40, the ball seat 36 (still holding the ball 30) pivots down in a counter-clockwise rotation about a ball seat pivot 38, and a stop 31 rotates and slides against a cooperating surface 36a on the ball seat 36 to hold the ball seat 36 in the counter-clockwise rotated position. The lever 32 rotates counterclockwise with the ball seat 36 around the pivot 38, wherein the lever 32 engages the locking tooth mechanism 34, thereby locking the inertial reel 10, and also latching the inertial reel 19 which will remain locked until reset. The inertial reel 19 may be manually unlatched after a latching event by pressing a simple unlatch device 42 to release the stop 31 and reset the locking portion to the ready position. The Latching mechanism will remain latched until the device 42 is pressed. The unlatch device 42 may be a simple membrane covering an end of the stop 31.

The acceleration level classified as a crash, which would latch the inertial reel in the locked condition, can be set individually depending on the vehicle and engineering requirements. A typical crash may involve an acceleration event from a low of approximately 3 Gs to approximately 4 Gs to well over 10 Gs. The spring 40 may be selected to provide latching of the inertial reel at acceleration levels above non-crash events, such as experienced on a bumpy road or driving off road. Different requirements are stipulated for on-road vehicles as well as civilian and military aircraft. The inertial reel can be manually unlocked at a later time by the occupant or optionally by maintenance personnel after a vehicle inspection has verified the vehicle and restraint are in operational condition.

While the latching sensor is described above as comprising the ball 30, the ball seat 36, and the spring 40, the latching sensor may in general comprise a mass, a pivoting member, and a spring, wherein the mass and pivoting member rotate about a pivot to compress the spring when under vertical acceleration, and a locking lever connected to the pivoting member rotates with the pivoting member and latches the reel portion.

While the locking and latching mechanisms described above are mechanical apparatus, a hybrid mechanical and electronic locking and/or latching mechanism is also contemplated. In the instance of such hybrid mechanism, the sensor may be replaced by a one or more axis accelerometer, and/or the lever 32 may be replaced by a servo mechanism.

Figure 4B:
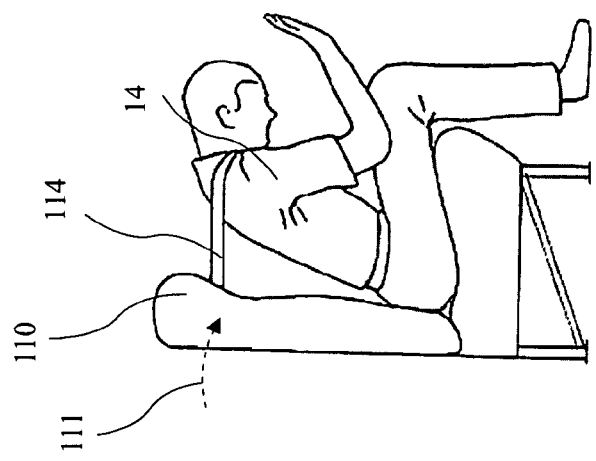
FIG. 4B shows the prior art seat bending during a crash.
Figure 4A:
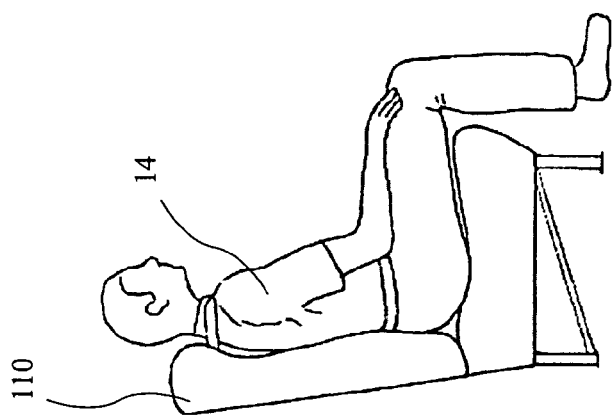
FIG. 4A is a prior art seat.

A prior art seat having a seat back 110 is shown in FIG. 4A in a rest position and the prior art seat is shown in FIG. 4B during a crash. As can be seen, the occupant 14 and the seat back 110 move significantly during the crash. The resulting occupant 14 contact with vehicle interiors is a major contributor to crash related injuries. Because of the need to minimize weight in vehicles, the use of heavy load bearing components is not desirable. The heavy load bearing components might be avoided by using multiple mounting points for the seat to distribute crash loads, but the issue then becomes the complication required to allow seat adjustability for vehicle operation or occupant comfort, and to allow for a folding seat for access to areas behind the seat.

Figure 5:
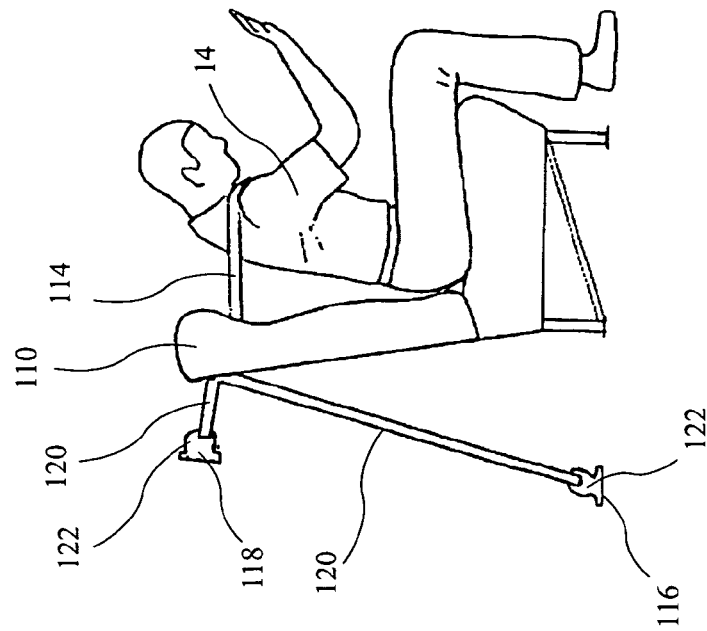
FIG. 5 shows a seat with an inertial reel connected to a seat back of the seat to limit seat bending during a crash.

An inertial reel seat restraint according to the present invention is shown attached to the seat in FIG. 5, during a crash event. A flexible link to the seat is provided by a seat inertia reel 122 and a webbing strap (or belt) 120 attached from the vehicle structure at floor mounting point 116 or elevated mounting point 118 to the seat back 110. The inertia reel 122 would allow full seat adjustability under normal conditions, wherein the inertial real 122 is unlocked. This allows the webbing strap 120 to extend and retract as required. A retractor spring would keep a slight tension on the webbing strap 120 to insure a close coupling between the seat 110 and the mounting points 116 or 118. The inertia reel 122 would automatically lock in a crash and reduce or prevent the seat 110 from moving. The additional restraint in seat movement will also restrain seat occupant 14 displacement. Less occupant 14 displacement will reduce the opportunity for the occupant 14 contact with interior vehicle components. A suitable seat inertial reel 122 is the Modular M-2K Belt Retractor Assembly made by Key Safety Systems, Inc in Detroit, Mich., or may be a latching inertial reel as described above.

While the invention herein disclosed has been described by means of specific embodiments and applications thereof, numerous modifications and variations could be made thereto by those skilled in the art without departing from the scope of the invention set forth in the claims.

We claim:

1. A latching inertial reel comprising:
a reel portion;
a locking portion comprising;
   a locking mechanism for temporarily locking the reel portion, the locking mechanism moveable to a locked position in response to a horizontal acceleration of a first level while the horizontal acceleration of the first level remains present, the locking mechanism comprising:
      a horizontally residing annular seat with an upward sloping wall;
      a ball resting on the seat; and
      a locking lever having an engaging end and a pivot end opposite the engaging end and to the left of the ball, wherein the horizontal acceleration of the first level causes the ball to move upwards on the sloping wall and push upwards on the locking lever to pivot the locking lever about the pivot end causing the engaging end to engage the locking tooth mechanism attached to the reel portion to temporarily lock the reel; and
   a latching mechanism for resettably locking the reel portion in response to a vertical acceleration of a second level until the latching mechanism is reset, which second level is independent of the first level, the latching mechanism comprising:
      a calibration spring;
      a latching mass comprising the ball and seat of the locking sensor, the latching mass resting on the calibration spring;
      the locking lever attached to the latching mass and the latching mass and the locking lever sharing a common pivot positioned to the right of the latching mass and between the latching mass and the engaging end of the locking lever,
      wherein the vertical acceleration of the second level causes the latching mass to move downwards compressing the calibration spring, pivoting the locking lever counter clockwise about the common pivot, and moving the engaging end of the locking lever to engage the locking tooth mechanism attached to the reel portion to lock the reel; and
   a reset for resetting the latching mechanism.

2. The latching inertial reel of claim 1, wherein;
the pivot end of the locking lever is attached to the latching mass; and
the locking lever pivots counter clockwise about the pivot end in response to the horizontal acceleration of the first level to engage the locking tooth mechanism attached to the reel portion to lock the reel.

3. A latching inertial reel comprising:
a reel portion;
a locking tooth mechanism connected to the reel portion;
a locking mechanism for locking the reel portion, the locking mechanism comprising:
   a horizontally sensing first mechanical sensor including a mass responsive to horizontal accelerations in all directions in the horizontal plane; and
   locking lever having a pivot end, and an engaging end for engaging the locking tooth mechanism to lock the reel portion, wherein the locking lever is moveable to temporarily engage the locking tooth mechanism in response to the first mechanical sensor; and
a latching mechanism for latching the reel portion, the latching mechanism comprising:
   a vertically sensing second mechanical sensor including the same mass as the first mechanical sensor, the mass responsive to vertical acceleration; and
   the locking lever, wherein the locking lever is moveable to resetably engage the locking tooth mechanism in response to the second mechanical sensor.

4. The latching inertial reel of claim 3, wherein the mass comprises a ball residing in a horizontally residing annular ball seat having a sloped wall, wherein the ball is displaceable up the sloped wall by a horizontal acceleration, and wherein displacement of the ball up the sloped wall urges the locking lever to rotate about the pivot end to engage the engaging end with the locking tooth mechanism.

5. The latching inertial reel of claim 4, wherein the second mechanical sensor comprises the ball, the ball seat, a ball seat pivot, and a spring vertically supporting the ball and the ball seat, wherein the locking lever is connected to the ball seat, and wherein compressing the spring causes:
- the ball seat to pivot about the ball seat pivot;
- the locking lever to pivot about the ball seat pivot; and
- the locking lever to engage the locking tooth mechanism.

6. The latching inertial reel of claim 5, further including a stop for holding the inertial reel in a latched position until the stop is released, wherein the stop slides against a cooperating surface on the ball seat to hold the ball seat in a pivoted position until the stop is released.

7. A latching inertial reel comprising:
- a reel portion;
- a locking tooth mechanism connected to a reel residing in the reel portion;
- a locking lever having a pivot end and an engaging end, the engaging end for engaging the locking tooth mechanism to lock the reel;
- a locking mechanism comprising a ball residing in a ball seat having a sloped wall, wherein the ball is displaceable up the sloped wall by a horizontal acceleration, and wherein displacement of the ball up the sloped wall urges the locking lever to rotate about the pivot end to engage the engaging end with the locking tooth mechanism; and
- a latching mechanism comprising the ball, the ball seat, a ball seat pivot, and a spring vertically supporting the ball and the ball seat, wherein the locking lever is connected to the ball seat, and wherein compressing the spring causes:
  - the ball seat to pivot about the ball seat pivot;
  - the locking lever to pivot about the ball seat pivot; and
  - the locking lever to engage the locking tooth mechanism.

8. The latching inertial reel of claim 7, further including a stop for holding the inertial reel in a latched position until the stop is released, wherein the stop slides against a cooperating surface on the ball seat to hold the ball seat in a pivoted position until the stop is released.

* * * * *